United States Patent [19]
Vos

[11] Patent Number: 5,351,709
[45] Date of Patent: Oct. 4, 1994

[54] CONTROL VALVES

[75] Inventor: Richard V. Vos, Randburg, South Africa

[73] Assignee: Prelude Pool Products C C, Randburg, South Africa

[21] Appl. No.: 131,687

[22] Filed: Oct. 6, 1993

[30] Foreign Application Priority Data

Oct. 7, 1992 [ZA] South Africa .................. 92/7704
Apr. 13, 1993 [ZA] South Africa .................. 93/2558

[51] Int. Cl.⁵ ............................................. F16K 17/00
[52] U.S. Cl. ...................................... 137/114; 15/1.7; 137/907
[58] Field of Search .................. 137/114, 907; 15/1.7

[56] References Cited

U.S. PATENT DOCUMENTS

| | | | |
|---|---|---|---|
| 1,908,357 | 5/1933 | Hornbruch | 137/114 |
| 4,368,751 | 1/1983 | Chauvier | 137/114 |
| 4,570,660 | 2/1986 | Chauvier | 137/907 X |
| 4,643,217 | 2/1987 | Frentzel | 137/907 X |
| 4,790,344 | 12/1988 | Chauvier | 137/907 X |

Primary Examiner—Stephen M. Hepperle
Attorney, Agent, or Firm—Michael D. Bednarek

[57] ABSTRACT

A control valve for use in a swimming pool containing an automatic pool cleaner is described. The valve comprises a main water passage having an inlet port in a cranked inlet portion and an outlet port. A valve chamber extends from the main passage. It has a relief valve and an outlet through its side wall. A by-pass passage connects the outlet to the main water passage. A valve member sensitive to the pressure in the by-pass passage is located within the chamber and is biassed by a spring into a closed position to close off the relief port. When the pressure in the by pass passage falls, the valve member is drawn into the open position in which it controls the opening of both the relief valve and the outlet in dependence upon its position.

17 Claims, 4 Drawing Sheets

CONTROL VALVES

This invention relates to control valves and in particular to regulating control valves used with automatic pool cleaners in swimming pools.

Automatic pool cleaners normally are connected through a flexible pipe to a suction opening in the base of the pool weir which is connected by suitable piping to a circulating pump. In order that the cleaner and the pipe are not subject to undue negative pressure during operation, the flexible pipe is often connected to the suction opening through a regulating control valve that permits water to be drawn therein to limit or to control the negative pressure in the flexible pipe and at the cleaner.

The invention is concerned with such a control valve and is, in particular, concerned with such a control valve of the kind comprising a main water passage having an inlet port and an outlet port; a valve chamber having an outlet connected to the said passage and having a relief port remote from the passage, the internal surround of the relief port comprising a valve seating; a valve member which is located within the chamber and which is biassed into a closed position in which it seats on the valve seating, the valve member being connected to a surface subject to the suction pressure in the main passage so that when there is excessive suction in the main passage, the valve member is drawn against the bias away from the closed position on the valve seating into the open position, against the said bias to open the relief port. Such a control valve is hereinafter referred to as "a control valve of the kind set forth".

Such a control valve of the kind set forth normally works satisfactorily. We have found however that when the swimming pool water contains a lot of leaves, these will tend to be caught between the valve member and the valve seating, and this has the consequence that the valve member is unable to move freely to relieve the high negative pressure in the main passage.

According to one aspect of the invention there is provided a control valve of the kind set forth in which the outlet is provided in the side of the valve chamber and a by-pass passage connects the outlet to the main water passage, and in which the valve member controls the amount both the relief port and the outlet are opened.

The underside of the valve member preferably constitutes the pressure sensitive means. The valve member is located so that the pressure sensitive member is subjected to the pressure in the by-pass passage when the valve member is in the closed position.

The valve chamber is preferably formed in a control boss which preferably has one end terminating close to the main passage.

The upper end of the boss is preferably closed by an apertured cap against the underside of which the valve member seals. As soon as the negative pressure in the bypass valve falls below a certain amount the valve member will be moved downwardly whereafter the bleed passage will be opened.

Preferably there is a bleed connection between the valve and the valve chamber which permits water flow between the downward projection and the bypass line.

It should be noted that in certain countries and under certain usages, the item which is described herein as a "weir" is known as a "skimmer". The language of this specification (including the claims) is to be construed accordingly.

Embodiments of the invention will now be described by way of example with reference to the accompanying drawings.

Figure 1:
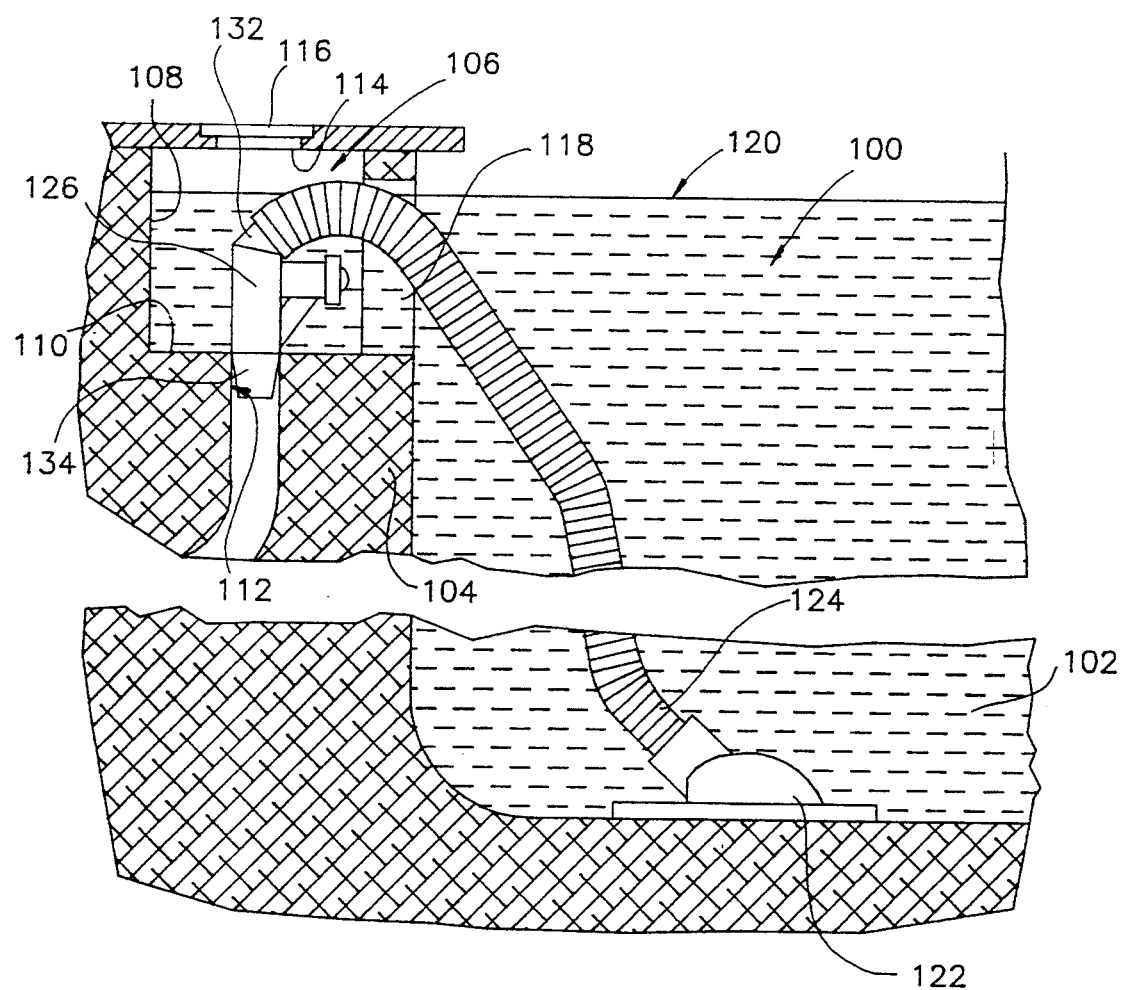
FIG. 1 is a diagrammatic sectional view of a swimming pool.

Referring now to the drawings, there is shown a detail of a swimming pool 100 containing a body of water (indicated at 102). The pool 100 is bounded by a wall 104 in the upper part of which and generally at the height of the water body 102 is provided with a concrete built in weir 106. The weir 106 incorporates a cuboidal chamber 108 having a base 110 with a suction port 112 therein and a top opening 114 closed by a removable grid 116 and a rectangular portal 118. The suction port 112 is connected to a circulating pump (not shown) (which is conveniently driven by an 0,75 kW motor and is designed to deliver 17 000 liters at 8 meters head) through suitable piping so that water can be drawn from the body 102, passed through a leaf trap and a filter and then returned to the pool 100 at a location remote from the weir 106. The normal level of the water body 102 is such that its upper surface 120 is about midway of the height of the portal 118 or slightly thereabove.

Within the pool 100 is an automatic pool cleaner 122. This cleaner may be of any desired construction but is preferably as described in U.S. Pat. No. 4,742,593. The pool cleaner 122 is connected through a flexible pipe 124 to the suction port 112 through the intermediate of an automatic regulating control valve 126 of the invention which will be described more fully below. The entire control valve 126 will in use be submerged below the level of the water in the pool and hence in the weir 106.

Figure 2:
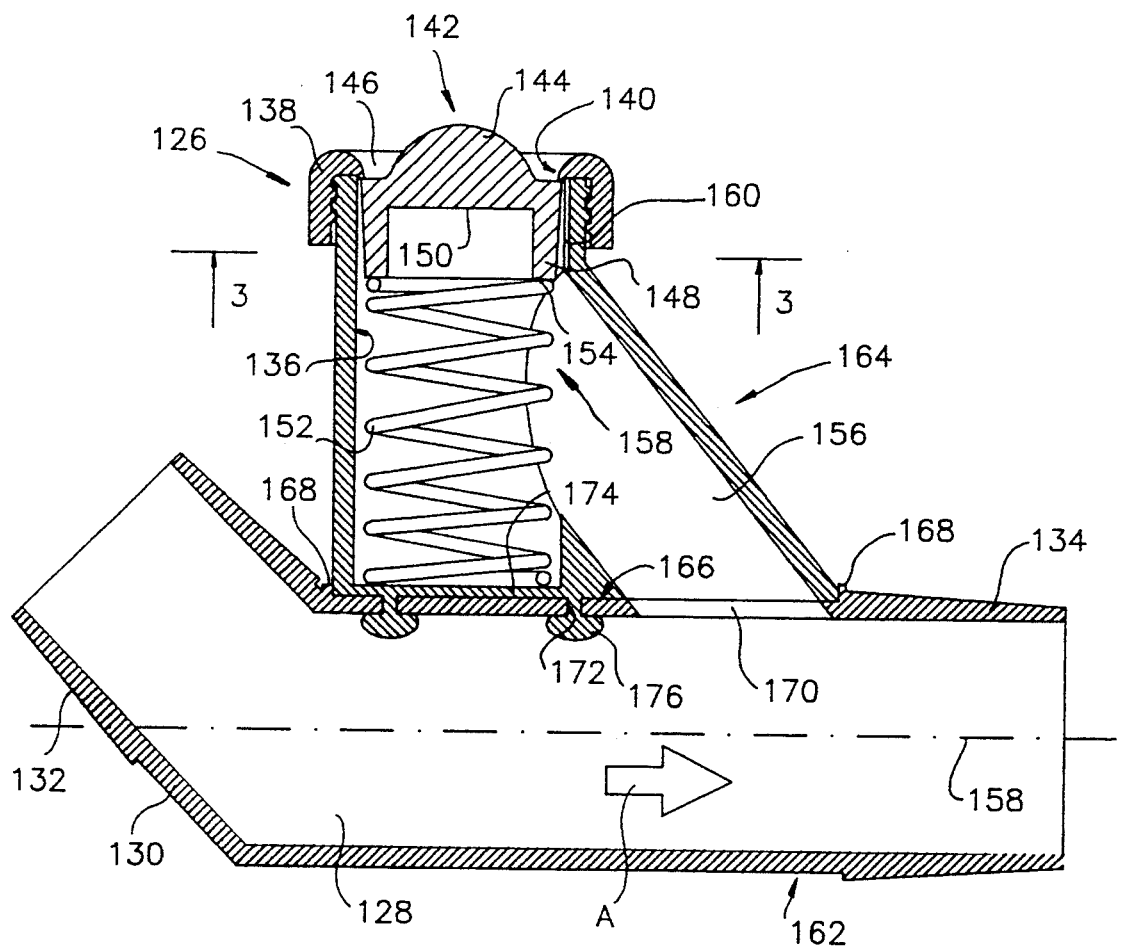
FIG. 2 is a diagrammatic sectional view of a control valve of the invention.
Figure 3:
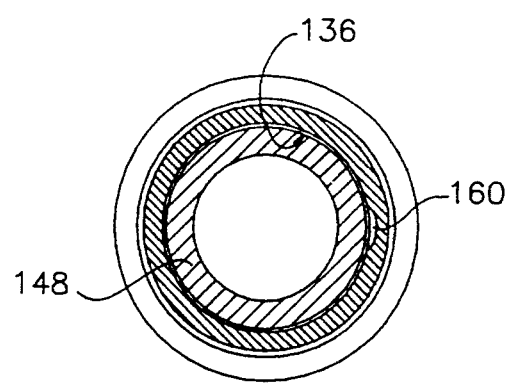
FIG. 3 is a section on line 3—3 of FIG. 2.

The automatic regulating control valve 126 is a two piece hollow plastics moulding. It comprises a 30 mm nominal internal diameter main water passage 128 having a cranked inlet portion 130 at one end. The ends of the fluid flow water passage 128 constitute inlet and outlet ports (i.e. the water flow is in the direction of the arrow A in FIG. 2) and are provided respectively with frusto-conical nozzle portions 132 and 134 to facilitate connection with the end of the pipe 124 and the suction port 112 respectively.

Close to cranked inlet portion 130 of the main fluid water passage 128 there is a cylindrical valve chamber 136 formed in a boss which has a 29,5 mm nominal internal diameter and which is closed at its lower end. The open end of the valve chamber 136 is externally screw-threaded and is closed by a screw-on cap 138 having an enlarged central aperture 140 which is of approximately 27,25 mm diameter and which acts as a relief port for the valve chamber 136.

A valve member 142 is located within the valve chamber 136. The valve member 142 comprises a solid domed head 144 which has a maximum chord of 22,75 mm and which sits on a flanged surround 146. A skirt 148 depends from the edge of the surround 146. The skirt 148 is slightly conical converging from its connection to the surround 146. The diameter of the skirt 148 at the surround is 29 mm which is such that it is a close fit within the valve chamber 136. The skirt 148 depends 9,5 mm from the surface 150 constituting the underside of the head 144 and surround 146. A spring 152 acts on the annular end surface 154 of the skirt 148 to bias the valve member 142 outwardly so that the flanged surround 146 butts and seals against the valve seat constituted by the underside of the cap 138. The spring 152 is conveniently a 1,25 kg spring.

A 21 mm nominal inner diameter by-pass conduit 156 extends at about 60° to the axis 158 of the main part of the main water passage 128 from near the nozzle 134. The conduit 156 enters into the side wall of the valve chamber 136 through an oval, port 158 located slightly below the upper end thereof. This port 158 constitutes the outlet opening for the valve chamber 136 and the inlet port for the by-pass conduit 156. The axial length of the port 158 (by which is meant the length in the direction of the axis of the valve chamber 136) is about 38 mm, its upper edge being about 12,5 mm from the end of the valve chamber 136 and hence the valve seat.

A shallow annular bleed groove 160 is formed in the wall of the valve chamber 136. The groove 160 is roughly arcuate in shape being about 4,5 mm at the wall surface and having a depth of about 0,8 mm.

As mentioned above, the valve 126 is formed in two parts. It comprises a main body part 162 and a top part 164.

The main body part 162 incorporates the main water passage 128 and the nozzles 132 and 134. It has a rectangular flat surface 166 on its outer side in the direction of the cranked inlet port 130. The surface 164 is surrounded by a peripheral rim 168. An oval opening 170 is formed in the surface 166 to constitute a continuation of and an outlet port from the by-pass conduit 156. In addition there are two small openings 172 for the purpose which be described below.

The top part 164 comprises the valve chamber 136 and the by-pass conduit 156. It terminates in a flat base 174 through which the by-pass conduit 156 passes. The base 174 fits on to the surface 166 and is closely surrounded by the rim 168. There are two mushroom headed projections 176 on the underside of the base 174. These projections 176 pass through the small openings 172 to hold the top part 164 firmly on the surface 166 without the necessity of bonding means. The projections 176 are passed through the openings 172 immediately after the top part 164 has been moulded. As these parts are still hot they can be passed through the small openings 172 whereafter they will expand into their mushroom shape to hold the parts 162 and 164 together as aforesaid.

In use, the control valve 126 is located in the weir 106 of a swimming pool. The outlet nozzle 134 is inserted into the suction port 112 at the base 110 of the weir 106. The inlet nozzle 132 at the cranked inlet portion 130 of the main water passage 128 is connected in use to the flexible pipe 124 leading to the automatic pool cleaner 122.

As water is drawn through the control valve 126 by the circulating pump of the pool, the negative pressure of the water in the bypass conduit 156 acts on the underside of the surface 150 of the valve member 142 and the annular end surface 154 of the skirt 148 which surfaces thus constitute a combined pressure sensitive surface for the valve member 142. This negative pressure acting on the pressure sensitive surface provides a force that motes the valve member 142 downwardly from valve seat on the underside of the cap 138 so that the bleed groove 160 is open to the water in the weir 106 and through which water is drawn.

The depth at which the valve member 142 settles within the valve chamber 136 is regulated by the force of the spring 152 and the negative pressure in the bypass conduit 156. As soon as the pump commences operation, the negative pressure will draw the valve member 142 downwardly until the surround 146 will be below the upper edge of the oval port 158 so that water will immediately be drawn into the main water passage 128. Should the negative pressure in the flexible pipe 124 and hence the by-pass conduit 156 rises to a greater extent, the valve member 142 is drawn still further from the valve seat on the underside of the cap 138 thereby exposing the oval port 158 above the surround 146 to a greater extent so that a more substantial amount of water can be drawn therethrough. The exact amount of water being drawn would depend upon the location of the valve 142 in the valve chamber 136 and as mentioned above, this location is determined by the negative force on the pressure sensitive surface and the biassing force of the spring 152.

It has been found that the control valve 126 provides a very accurate control of the negative pressure to which the automatic pool cleaner is subject. This can be of considerable importance depending on the type of automatic pool cleaner which is used. Specifically if the automatic pool cleaner is one as described in U.S. Pat. No. 4,742,593 using a flexible diaphragm, excessive pressure may be deleterious to the operation and life of the cleaner.

It will be noted that the water passing along the by-pass conduit 156 has a component moving in the same direction as the water flow along the main water passage 128. This improves the operation of the valve 126.

It has further been found that should leaves enter the weir 106 which with conventional control valves will tend to clog the inlet to the control valve, the valve member 142 will be drawn down substantially to allow the leaves to be sucked into the main passage 128 and hence the suction port 116 of the weir through the by-pass conduit 156. As the leaves have thus passed into the circulating system, they will have no further effect upon the control valve 126 which will continue to operate normally. It has been noted in particular that the control valve 126 can so accommodate even very large leaves that tend to clog conventional control valves now on sale in South Africa.

Figure 4:
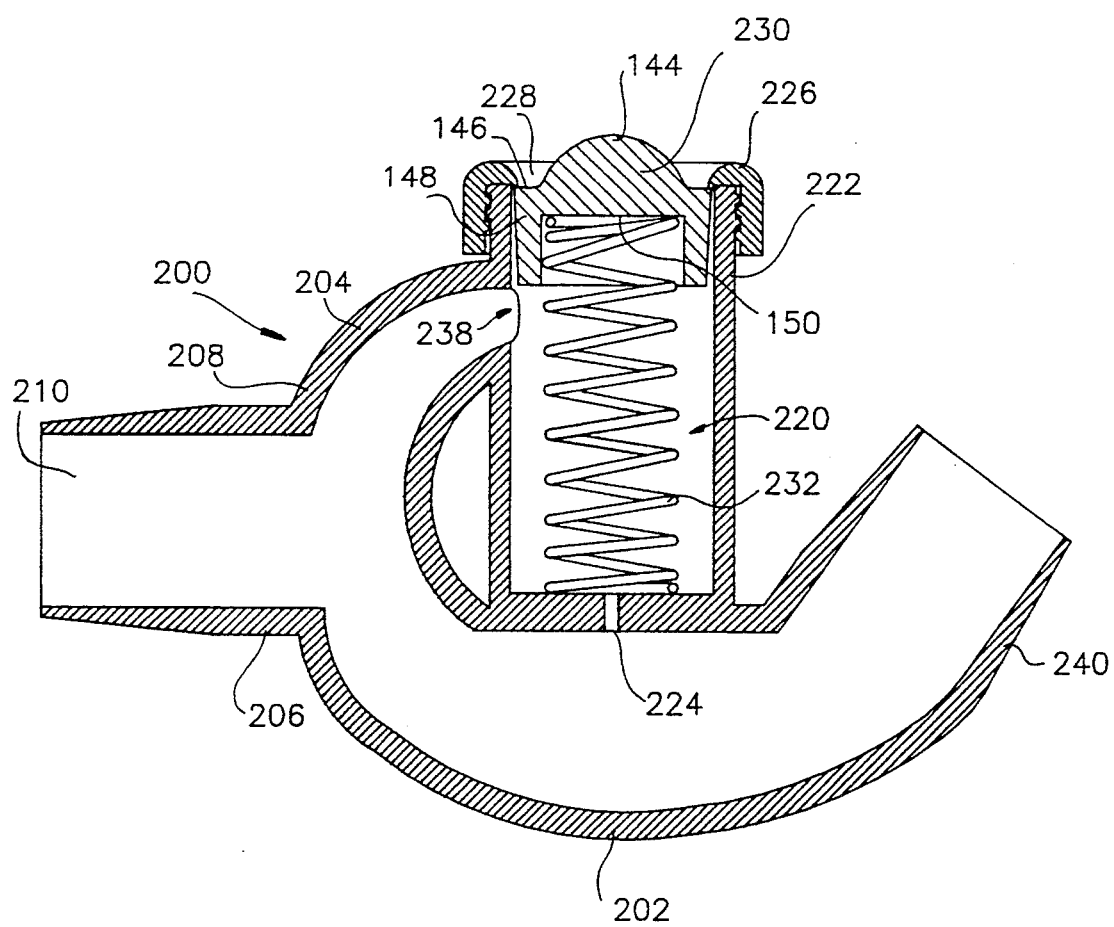
FIG. 4 is a view similar to FIG. 2 of a modified control valve of the invention.

Reference is now made to FIG. 4 in which is illustrated a modified control valve 200 of the invention. This control valve 200 differs from the control valve 126 in that it comprises a main J-shaped portion consisting of a long arm 202, a short arm 204 and a short central connecting portion 206 leading from the centre of the arcuate base 208 of the "J" to an outlet port 210 that in use is connected to the suction port 112 of the weir 106. The short arm 204 enters into a cross-chamber 220 that extends in one direction to the long arm 202 and extends in the other direction in the form of a threaded boss 222 beyond the short arm 204. All the aforesaid parts are generally circular in section.

The base of the cross-chamber 220 has a small opening 224 connecting with the interior of the long arm 202. The boss 222 has a cap 226 screwed thereon, the cap 226 having an opening 228 defined by an inwardly directed flange. The cross-chamber 220 contains a valve member 230 or plunger (and hence it may be referred to as a "valve chamber"). The valve member 230 is virtually identical to the valve member 142 and the parts thereof are indicated by similar reference numbers. A spring 232 acts on the surface 150 at the underside of the valve member 230 and biasses it towards the cap 226 and into a sealing position in which the surround 146 seals against the valve seat constituted by the inside periphery of the opening 228.

The shorter arm 204 enters the side wall of the cross-chamber 220 through a port 238 which constitutes an outlet from chamber 136 and the inlet to the short arm 204. The length of the skirt 148 is such that when the valve member 230 is in the sealing position, the skirt 148 blocks off the upper portion of the port 238 leaving the remainder open so that the underside 150 of the valve member 230 is subject to the pressure in the short arm 204 and constitutes a pressure sensitive surface for the valve member 230.

In use, the cranked end 240 of the long arm 202 is connected to the flexible pipe 124 leading to the pool cleaner 122 and the connecting portion is connected to the suction opening 112 in the weir 106 (see FIG. 1). The effect of the crank 240 is to minimize the angle through which the flexible pipe 124 must be bent. The valve 200 is submerged in the water in the weir 106.

The valve 200 operates in the same manner as the valve 126.

By proper selection of the springs 152 and 232, the valves 126 and 200 will operate at any desired negative pressure. It will also ensure speedy operation of the valve members 142 to relieve the pressures without delay. Furthermore by screwing the cap 138 and 226 further from or tighter on to the valve chambers 136 and 220, the pressure necessary to open the valves 126 and 200 can be varied.

It will be seen that the by-pass lines (i.e. 156 and that constituted by the shorter arm 204) connect with the main water passages (i.e. 128 and that constituted by the long arm 202 and the connecting portion 206) downstream of the inlet to the by-pass line and indeed downstream of the inlet to the valve chamber 136 and 220.

Figure 5:
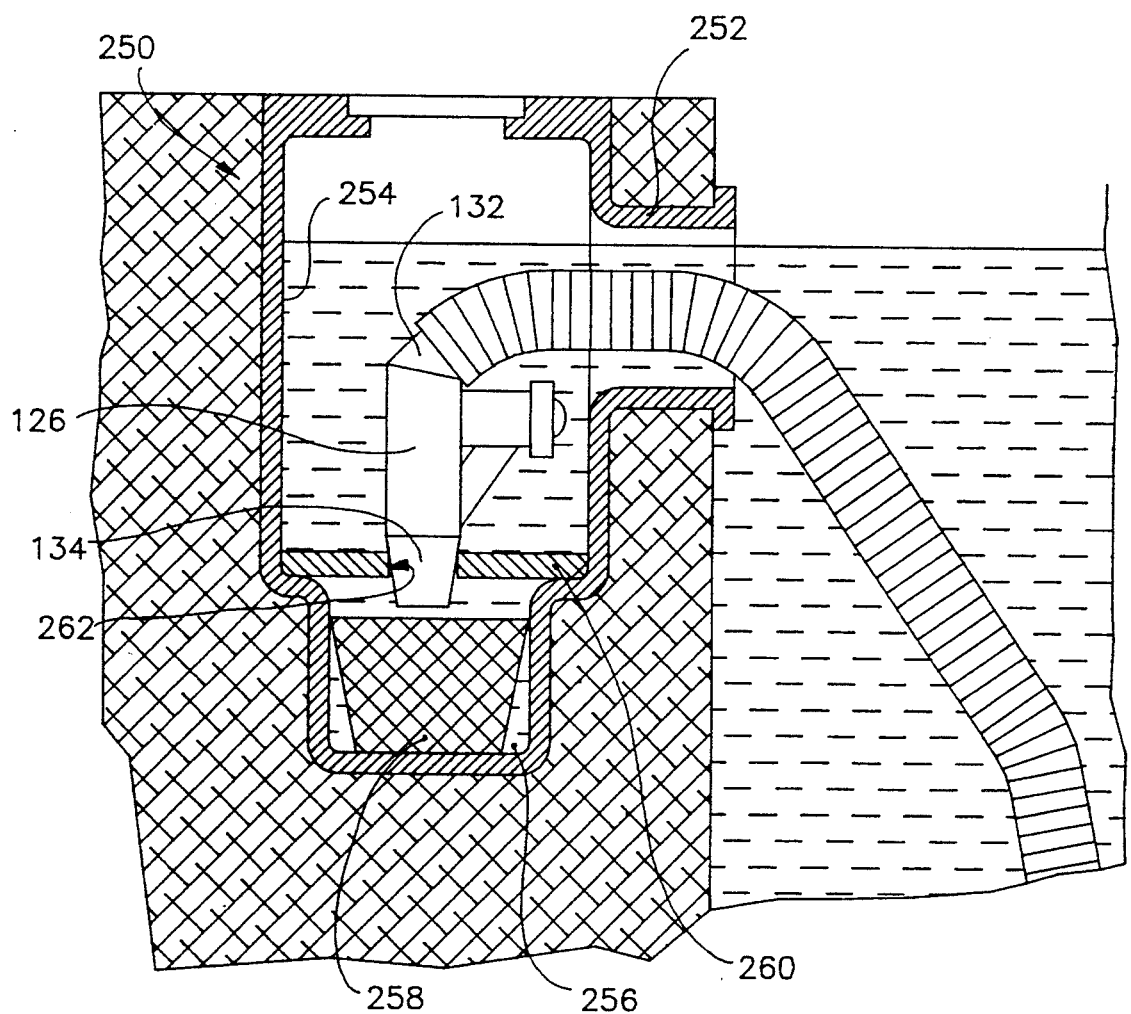
FIG. 5 is a view similar to FIG. 1 showing a control valve in a skimmer for the pool.

Reference is made to FIG. 5 which shows the control valve 126 in position in a moulded plastic weir or skimmer 250 of any well-known kind and for example a skimmer as produced by Hayward Pool Products, Inc or American Products. This skimmer 250 has a rectangular section inlet 252 leading to a main cylindrical chamber 254 located about leaf trap chamber 256 containing a leaf trap 258 and having an outlet (not shown) for connection to the piping leading to a pump and filter in known manner. A separator plate 260 is provided between the chambers 254 and 256. This plate 260 has a central opening 262 which constitutes the suction port of the skimmer 250. The outlet nozzle end 134 of the control valve 126 is connected to this suction port 262. The cranked inlet nozzle end 132 of the control valve 126 is connected to flexible piping 264 leading to a pool cleaner (not shown) in the body of water 102 of a pool 100 in the same manner as described with reference to FIG. 1. The control valve 126 operates in the same way as it does as described above.

The invention is not limited to the precise constructional details hereinbefore described. For example the various dimensions and other values mentioned may vary as desired. Instead of the bleed passage being formed in the wall of the valve chamber 136, this bleed passage may be formed in the skirt 32 of the valve 138. Other modifications may be made as will be apparent to those skilled in the art.

I claim:

1. A control valve comprising:
   a main water passage having an inlet port and an outlet port;
   a valve chamber having a side wall and an outlet in the side wall and a pressure relief port remote from the outlet;
   an apertured cap closing off the valve chamber, the underside of said cap constituting the valve seat;
   a bypass passage connecting the outlet to the main water passage;
   a valve member located within the chamber and being movable between an open position and a closed position to which it is biassed, the valve member when in said closed position seating on the valve seat and isolating the outlet from the relief valve; said valve member controlling the opening of the relief valve and the outlet in dependence upon its position; and
   a pressure sensitive surface which is connected to the valve member and which is subject to the suction pressure in the by-pass passage so that when there is excessive suction in the main passage, the valve member is drawn against the bias away from the closed position on the valve seat into an open position.

2. A control valve as claimed in claim 1 in which the underside of the valve member constitutes the pressure sensitive surface.

3. A control valve as claimed in claim 1 in which the valve member is located so that the pressure sensitive surface is subjected to the pressure in the by-pass passage when the valve member is in the closed position.

4. A control valve as claimed in claim 1 comprising a bleed passage between the valve member and the valve chamber.

5. A control valve as claimed in claim 4 in which the valve member is shaped so that as soon as the pressure in the bypass passage falls below a certain amount the valve member will be moved away from the valve seat whereafter the bleed passage will be opened.

6. A control valve as claimed in claim 1 in which the control valve is biassed by a spring.

7. A control valve as claimed in claim 1 in which the by pass passage is arranged so that the water passing to the main water passage has a component of movement in the same direction as the direction of movement of the water passing along the main water passage.

8. A control valve as claimed in claim 1 in which the main water passage is cranked at the inlet portion thereof.

9. A control valve as claimed in claim 1 in which the underside of the valve member is surrounded by a skirt.

10. A control valve as claimed in claim 1 formed from two plastics mouldings, one such plastics moulding incorporating the main water passage and the other plastics moulding incorporating the valve chamber and the by pass passage.

11. A control valve comprising:
   a main water passage having an inlet port and an outlet port;
   a valve chamber having a side wall and an outlet in the side wall and a pressure relief port remote from the outlet, the internal surround of the relief port comprising a valve seat;

a by-pass passage connecting the outlet to the main water passage;

a valve member located within the chamber and being movable between an open position and a closed position to which it is biassed, the valve member when in said closed position seating on the valve seat and isolating the outlet from the relief valve; said valve member controlling the opening of the relief valve and the outlet in dependence upon its position; and a pressure sensitive surface which is connected to the valve member and which is subject to the suction pressure in the bypass passage so that when there is excessive suction in the main passage, the valve member is drawn against the bias away from the closed position on the valve seat into an open position:

the said control valve being formed from two plastics moldings, one such plastics molding incorporating said main water passage and the other plastics molding incorporating said valve chamber and said by pass passage, the said two plastics molding have surfaces butting against each other, one of said moldings having openings therein and the other of said moldings having headed projections which pass through the openings with the heads acting against the said one of the moldings to hold said two plastics moldings together.

12. A control valve as claimed in claim 1 further comprising a bleed opening connecting the valve chamber on the side of the valve member remote from the relief valve to the main water passage.

13. A control valve comprising:

a main water passage having an inlet port and an outlet port;

a valve chamber having a side wall and an outlet in the side wall and a pressure relief port remote from the outlet, the internal surround of the relief port comprising a valve seat, said valve chamber extending at right angles to the main water passage with its end remote from the relief valve being adjacent said main water passage;

a by-pass passage connecting the outlet to the main water passage, said by-pass passage extending from the outlet at an angle to the valve chamber and said main water passage, and joins said main water passage at a location closer to the outlet port of said main water passage than the valve chamber;

a valve member located within the chamber and being movable between an open position and a closed position to which it is biassed, the valve member when in said closed position seating on the valve seat and isolating the outlet from the relief valve; said valve member controlling the opening of the relief valve and the outlet in dependence upon its position; and a pressure sensitive surface which is connected to the valve member and which is subject to the suction pressure in the by-pass passage so that when there is excessive suction in the main passage, the valve member is drawn against the bias away from the closed position on the valve seating into an open position.

14. In a swimming pool, the combination of:

a pool cleaner;

a flexible pipe having two ends, one of said ends being connected to the pool cleaner;

a weir having a suction port; and a control valve comprising:

a main water passage having an outlet port connected to said suction port, and an inlet port connected to the other end of the flexible pipe;

a valve chamber having a side wall and an outlet in the side wall and a pressure relief port remote from the outlet, the internal surround of the relief port comprising a valve seat;

a by-pass passage connecting the outlet to the main water passage;

a valve member located within the chamber and being movable between an open position and a closed position to which it is biassed, the valve member when in said closed position seating on the valve seat and isolating the outlet from the relief valve, said valve member controlling the opening of the relief valve and the outlet in dependence upon its position; and a pressure sensitive surface which is connected to the valve member and which is subject to the suction pressure in the by-pass passage so that when there is excessive suction in the main passages, the valve member is drawn against the bias away from the closed position on the valve seating into an open position.

15. A control valve as claimed in claim 10, in which the two plastics molding have surfaces butting against each other, one of said moldings having openings therein and the other of said moldings having headed projections which pass through the openings with the heads acting against the said one of the moldings to hold said two plastics moldings together.

16. A control valve as claimed in claim 1, in which the valve chamber extends at right angles to the main water passage with its end remote from the relief valve adjacent said main water passage, in which the by-pass passage extends from the outlet at an angle to the valve chamber and said main water passage, and in which the by-pass passage joins said main water passage at a location closer to the outlet port of said main water passage than the valve chamber.

17. In a swimming pool, the combination of:

a pool cleaner;

a flexible pipe having two ends, one of said ends being connected to the pool cleaner;

a weir having a suction port; and a control valve as claimed in claim 1, in which the outlet port of the main water passage is connected to said suction port, and the inlet port of the main water passage is connected to the other end of the flexible pipe.

* * * * *